(12) United States Patent
Murata et al.

(10) Patent No.: US 7,948,932 B2
(45) Date of Patent: May 24, 2011

(54) RADIO COMMUNICATION APPARATUS, AND MOBILE STATION

(75) Inventors: Syuuichi Murata, Yokohama (JP); Akihide Otonari, Kasuya (JP); Junichi Niimi, Kunitachi (JP); Takahiro Matusaki, Miura (JP); Atsushi Tanaka, Yokohama (JP); Yuka Araikawa, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 448 days.

(21) Appl. No.: 11/130,178

(22) Filed: May 17, 2005

(65) Prior Publication Data
US 2006/0120403 A1    Jun. 8, 2006

(30) Foreign Application Priority Data

Nov. 25, 2004   (JP) ................................. 2004-340557

(51) Int. Cl.
H04W 4/00  (2009.01)
H04B 7/00  (2006.01)
G06F 11/00 (2006.01)
H04J 3/00  (2006.01)

(52) U.S. Cl. ........ 370/328; 370/252; 370/310; 370/332; 370/465; 370/468

(58) Field of Classification Search .......... 370/428–429, 370/465–468, 310, 332–333, 341, 345, 349, 370/477, 437, 485, 231–233, 328–329, 330, 370/338, 395.21, 401, 492–493, 501–502, 370/911, 913–914; 455/101–11, 44, 95, 455/550.1, 556.2, 561, 7, 11.1, 134–135, 450–451, 452.1–452.2, 453, 509, 514, 517, 555, 557; 375/261, 298; 710/52–57, 60, 62, 72, 74; 714/18, 746–752
See application file for complete search history.

(56) References Cited

U.S. PATENT DOCUMENTS

| | | | |
|---|---|---|---|
| 6,754,200 B1 * | 6/2004 | Nishimura et al. | 370/349 |
| 7,200,788 B2 * | 4/2007 | Hiraki et al. | 714/748 |
| 7,257,423 B2 * | 8/2007 | Iochi | 455/561 |
| 7,277,492 B2 * | 10/2007 | Itoh | 375/259 |
| 7,330,432 B1 * | 2/2008 | Revsin et al. | 370/235 |
| 2002/0141367 A1 * | 10/2002 | Hwang et al. | 370/335 |
| 2004/0027997 A1 * | 2/2004 | Terry et al. | 370/276 |
| 2004/0184417 A1 * | 9/2004 | Chen et al. | 370/328 |
| 2004/0266358 A1 * | 12/2004 | Pietraski et al. | 455/67.11 |
| 2005/0174982 A1 * | 8/2005 | Uehara et al. | 370/345 |

FOREIGN PATENT DOCUMENTS

WO   WO 2004/073346 A1 *   8/2004

* cited by examiner

*Primary Examiner* — Meless N Zewdu
(74) *Attorney, Agent, or Firm* — Murphy & King, P.C.

(57) ABSTRACT

A radio communication apparatus (mobile station) in which analysis is performed on the transmission of data to an external apparatus. A mobile station transmitting the CQI information used for adaptive modulation control in the radio base station comprises a supervising unit operable to supervise a staying condition of data to be transmitted to an external apparatus, a CQI generating unit for generating the CQI information reflecting the result of a supervising process by the supervising unit, and a transmitting unit for transmitting the generated CQI information to the radio base station, and a mobile station for sending a re-transmission request reflecting the result of the supervising process.

6 Claims, 4 Drawing Sheets

| CQI | TBS | NUMBER OF CODES | MODULATION SCHEME | CPICH-SIR(dB) |
|---|---|---|---|---|
| 1 | 137 | 1 | QPSK | 0.5 |
| 2 | 173 | 1 | QPSK | 1.5 |
| 3 | 233 | 1 | QPSK | 2.5 |
| ... | ... | ... | ... | ... |
| 14 | 2583 | 4 | QPSK | 13.5 |
| 15 | 3319 | 4 | QPSK | 14.5 |
| 16 | 3565 | 5 | 16-QAM | 15.5 |
| 17 | 4189 | 5 | 16-QAM | 16.5 |
| ... | ... | ... | ... | ... |
| 29 | 24222 | 15 | 16-QAM | 28.5 |
| 30 | 25558 | 15 | 16-QAM | 29.5 |

Fig.2

RADIO COMMUNICATION APPARATUS, AND MOBILE STATION

CROSS REFERENCE TO RELATED APPLICATION

This application is related to and claims priority to Japanese Application No. 2004-340557 filed Nov. 25, 2004 in the Japanese Patent Office, the contents of which are incorporated by reference herein.

BACKGROUND OF THE INVENTION

1. Field of the Invention

The present invention relates to a radio communication apparatus and, for example, to a mobile station used for a mobile radio communication system having employed the W-CDMA (UMTS) communication system.

2. Description of the Related Art

At present, efforts are continuously made by the 3GPP (Third Generation Partnership Project) for standardization of the W-CDMA (UMTS) system, which is one of the third generation mobile communication systems. The HSDPA (High Speed Downlink Packet Access), which can provide a maximum transmission rate of about 14 Mbps in the downlink, has been specified as a feature of the standardization.

The HSDPA employs adaptive modulation and coding (AMC) and is characterized, for example, by adaptive switching of the QPSK modulation scheme and the 16 QAM scheme in accordance with the radio environment between the base station and mobile stations.

Moreover, the HSDPA employs an H-ARQ (Hybrid Automatic Repeat reQuest). In the H-ARQ, when a mobile station detects an error in the data received from a base station, a retransmission request is transmitted to the base station. The base station, upon receiving this re-transmission request, executes the re-transmission of data. Therefore, a mobile station executes an error correction decoding using both the data already received and the re-transmitted received data. In the H-ARQ as described above, even if an error exists, the number of times of re-transmission is minimized by effective use of the received data.

Principal radio channels used for the HSDPA include HS-SCCH (High Speed-Shared Control Channel), HS-PDSCH (High Speed-Physical Downlink Shared Channel), and HS-DPCCH (High Speed-Dedicated Physical Control Channel).

HS-SCCH and HS-PDSCH are shared channels of the downlink (namely, transmitting information from the base station to the mobile station), while HS-SCCH is a control channel for transmitting various parameters for data to be transmitted by the HS-PDSCH. Various parameters include modulation type (Modulation Scheme) information indicating a modulation type to be used, the number of spreading codes to be assigned (number of codes), and pattern of the rate matching process to be implemented before transmission.

Meanwhile, HS-DPCCH is a dedicated control channel of the uplink (namely, from the mobile station to the base station). For example, this channel is used by a mobile station to transmit to the base station the result of acknowledgment or non-acknowledgment of reception (as the ACK signal or the NACK signal) of the data received from the base station via the HS-PDSCH channel. If a mobile station fails to receive the data (for example, if a CRC error is detected in the received data), the base station executes the re-transmission control because the NACK signal is transmitted from the mobile station as the re-transmission request. If neither the ACK signal nor the NACK signal can be received (in the case of DTX), the base station also executes the re-transmission control. Accordingly, when the DTX condition occurs, if the mobile station does not transmit the ACK signal or the NACK signal, this condition may also be considered a re-transmission request.

Moreover, HS-DPCCH is also used to transmit reception quality information (for example, SIR) of the received signal from the base station measured by the mobile station to the base station as the CQI (Channel Quality Indicator) information. The base station switches a type of transmission of downlink with the CQI information received. Namely, when the CQI information indicates that the downlink has a favorable radio environment, the type of transmission is switched to the modulation scheme enabling high-speed transmission of data. When the CQI information indicates, on the contrary, that the radio environment of the downlink is unfavorable, the type of transmission is switched to the modulation scheme for the lower transmission rate of data (namely, adaptive modulation is conducted).

[Channel Format]

Next, a channel format in the HSDPA channel will be described.

FIG. 1 illustrates a channel format in the HSDPA channel. Since the W-CDMA employs a code division multiplexing, each channel is demultiplexed with the code.

The following channels are not shown, but will be described briefly here for the sake of clarity. The CPICH (Common Pilot Channel) and P-CCPCH (Primary Common Control Physical Channel) are respectively common channels of the downlink. The CPICH is the channel used for channel estimation, cell search in the mobile station, and as the timing standard of the other physical channel of the downlink in the same cell. The P-CCPCH exists within each cell and is used for transmission of the broadcast information.

The following describes the timing relationship of channels with reference to FIG. 1. As illustrated in the figure, each channel forms one frame (10 ms) with 15 slots (each slot corresponds to the length of 250 chips). As described above, since the CPICH channel is used as the standard of the other channels, the leading parts of the frames of the P-CCPCH and HS-SCCH channels are well matched with the leading parts of the frames of the CPICH. Here, the leading part of the frame of the HS-PDSCH is delayed by two slots from the HS-SCCH channel, or the like, in order to make it possible for the mobile station to demodulate the HS-PDSCH with the demodulation scheme corresponding to a modulation type indicated by the modulation type information received via the HS-SCCH. Moreover, the HS-SCCH and HS-PDSCH form one sub-frame with three slots.

The HS-DPCCH is the uplink channel. The first slot thereof is used to transmit the ACK/NACK signal, which is the response signal for verifying reception to the base station from the mobile station after the passage of approximately 7.5 slots from the reception of the HS-PDSCH channel. The second and third slots threreof are used for periodic feedback transmission of the CQI information for the adaptive modulation control to the base station. Here, the CQI information to be transmitted is calculated on the basis of the reception environment (for example, the SIR measurement result of the CPICH) which has been measured within the period defined by the timing between the fourth slots through the first slots of the transmission preceding the CQI information.

FIG. 2 illustrates a CQI table for using received SIR (Signal to Interference Ratio) of the CPICH. As illustrated in FIG. 2, the table defines the number of TBS (Transport Block Size)

bits, the number of codes, modulation type, and correspondence between CPICH and SIR respectively for the CQI information 1 to 30.

Here, the number of TBS bits indicates the number of bits transmitted within one sub-frame, the number of codes indicates the number of spreading codes used for transmission of the HS-PDSH channel, and the modulation type indicates either the QPSK and QAM methods.

As shown in the figure, the better (higher) the SIR of the CPICH channel is, the larger the value of the CQI. As the CQI value increases, the number of corresponding TBS bits and the number of spreading codes increase as well, and the modulation scheme is switched to the QAM modulation system. Accordingly, it can be understood that when the SIR is better, evidencing a more optimal radio environment, the faster the transmission rate. However, consumption of the available radio resources (spreading code or the like) increases correspondingly.

The table illustrated in the figure may be stored in the memory of the mobile station. As explained previously, the mobile station measures the received SIR of the CPICH during the receiving environment measuring period and transmits the identified CQI corresponding to the SIR measured with reference to the stored table to the base station.

The base station executes the adaptive modulation control described previously in accordance with the received CQI information to attain the transmission control analyzing the receiving environment of the CPICH in the mobile station. The channel format of HSDPA has been briefly described above. The items for HSDPA are disclosed, for example, in the 3G TS 25. 212 (3rd Generation Partnership Project: Technical Specification Group Radio Access Network; Multiplexing and channel coding (FDD) V6. 2.0 (June 2004)).

According to the prior art described above, transmission control may be efficiently realized by analyzing the radio environment between the mobile station and base station through the adaptive modulation control and re-transmission control.

However, analysis is not performed for the case of a mobile station transmitting (transferring) the data received from the base station to an external apparatus (the other apparatus connected by wire or radio to the mobile station).

For example, if the transmission (transfer) rate for the external apparatus is too slow, resulting in the data being held, the adaptive modulation control and re-transmission control are carried out without any particular analysis of the environment.

In some cases, the amount of held data exceeds the threshold value (limit value) and the data is overwritten. In this case, the re-transmission control may be conducted by an upper layer (for example, an application layer), but the re-transmission control becomes slower for the upper layer and thereby maximally efficient transmission (transfer) of data to the external apparatus cannot be realized, resulting in a drop in throughput.

SUMMARY OF THE INVENTION

Accordingly, an object of the present invention is to provide a radio communication apparatus and a mobile station in which analysis is performed to aid the transmission of data to an external apparatus.

Moreover, since currently there is no analysis performed on the specifications of an external apparatus and its connection mode to an external apparatus, unwanted radio resources may be used in some cases.

Accordingly, another object of the present invention is to control the use of unwanted radio resources by analyzing the specifications of an external apparatus and the connection mode of the external apparatus.

In one embodiment of the present invention, a radio communication apparatus transmits a parameter used for adaptive modulation control in a transmitter executing an adaptive modulation control. The radio communication apparatus comprises a supervising unit for supervising the staying condition of data to be transmitted to an external apparatus and a parameter generating unit for generating a parameter reflecting the supervising result by the supervising unit, this generated parameter to be used for adaptive modulation control.

Preferably the parameter generating unit also reflects the quality of the signal received from the transmitter at the time of the generation of the parameter.

Preferably the parameter generating unit generates the parameters for transmission at a lower transmission rate with the adaptive modulation control if the supervising result shows the staying conditions of a larger amount of data.

In one embodiment of the present invention, a radio communication apparatus transmits a re-transmission request to a transmitter for a re-transmission control, with the radio communication apparatus comprising a supervising unit for supervising the staying condition of data to be transmitted to an external apparatus, and a re-transmission control unit for transmitting the re-transmission request on the basis of the supervising result generated by the supervising unit, even when no error is generated about received data from the transmitter.

Preferably the re-transmission request based on the supervising result by the re-transmission control unit is limited to the response to the new transmission or to the Nth re-transmission (N: a natural number that is smaller than the maximum number of times of re-transmission) from the new transmission.

In one embodiment of the present invention, a mobile station, which is conformable to HSDPA and transmits CQI information used for adaptive modulation control in a radio base station, comprises a supervising unit for supervising the staying condition of data to be transmitted to an external apparatus, a CQI generating unit for generating the CQI information reflecting the supervising result by the supervising unit, and a transmitting unit for transmitting the generated CQI information to the radio base station.

In another embodiment of the present invention, a mobile station, which is conformable to HSDPA and transmits a NACK signal used for re-transmission control executed by a radio base station, comprises a supervising unit for supervising the staying condition of data to be transmitted to an external apparatus, and a transmitting unit for transmitting the NACK signal to the radio base station or transmitting neither the ACK signal nor the NACK signal on the basis of the supervising result by the supervising unit.

Preferably the transmitting unit transmits the NACK signal to the radio base station or transmits neither the ACK signal nor the NACK signal even when no error is found in the data received from the radio base station and the ACK signal can be transmitted.

In one embodiment of the present invention, a radio communication apparatus transmits a parameter used for adaptive modulation control to a transmitter executing the adaptive modulation control. The radio communication apparatus comprises a parameter generating unit for generating a parameter in accordance with an external apparatus or in accordance with the specifications of the connection modes of the external apparatus, and a transmitting unit for transmitting the generated parameter as the parameter used for the adaptive modulation control.

In another embodiment of the present invention, a mobile station, which is conformable to HSDPA and transmits the CQI information used for adaptive modulation control in a radio base station, comprises a CQI information generating unit for generating the CQI information in accordance with an external apparatus or in accordance with the specifications of the connection modes of the external apparatus, and a transmitting unit for transmitting the generated CQI information.

BRIEF DESCRIPTION OF THE DRAWINGS

FIG. 2 shows an example of a CQI table.

DETAILED DESCRIPTION OF THE PREFERRED EMBODIMENTS

A preferred mode for carrying out the present invention will be explained with reference to the accompanying drawings.

[a] Explanation of a First Embodiment

[Structure of Radio Communication Apparatus]

Figure 3:
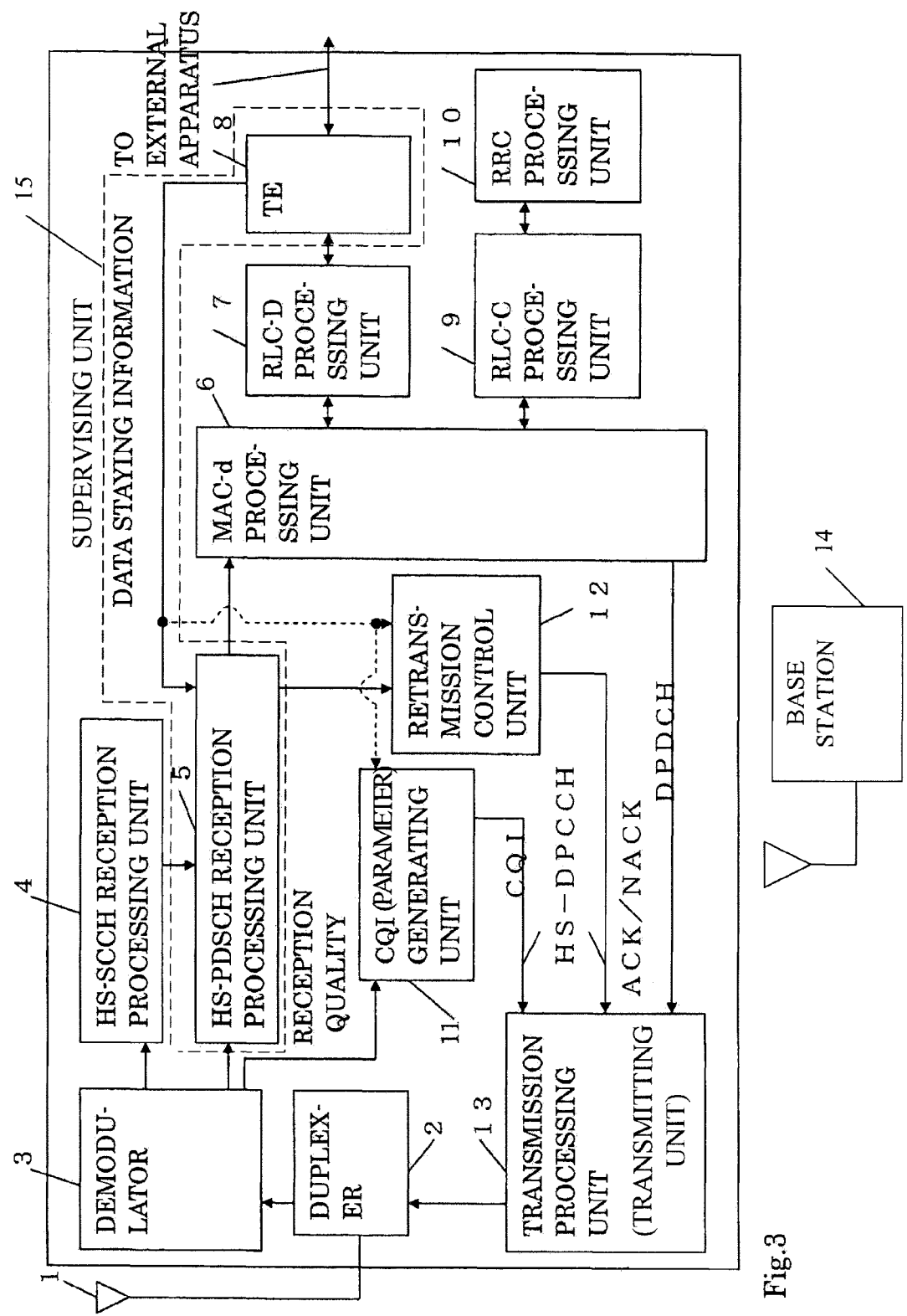
FIG. 3 shows a radio communication apparatus (mobile station) in the present invention.

FIG. 3 shows a communication apparatus of the present invention. As an example of the radio communication apparatus, a mobile station, which is used in the mobile communication system corresponding to WCDMA (UMTS) employing HSDPA, will be explained. It is of course possible to apply the apparatus of the present invention to a radio communication apparatus used in other mobile communication systems.

In this figure, numeral 1 denotes an antenna; 2, a duplexer; 3, a demodulator; 4, an HS-SCCH reception processing unit; 5, an HS-PDSCH reception processing unit; 6, an MAC-d processing unit; 7, an RLC-D processing unit; 8, a TE (Terminal Equipment); 9, an RLC-C processing unit; 10, an RRC processing unit; 11, a CQI generating unit; 12, a re-transmission control unit; 13, a transmission processing unit, 14, a base station, and 15, a supervising unit.

The mobile station receives the signal with the antenna 1 for the downlink (for example, CPICH, P-CCPCH, HS-SCCH, HS-PDSCH or the like) and applies the signal to the demodulator 3 via the duplexer 2.

The demodulator 3 performs receiving processes such as orthogonal detection to the received signal and applies the demodulated signal to the HS-SCCH reception processing unit 4 and HS-PDSCH reception processing unit 5. Moreover, the demodulator 3 measures the reception quality (for example, SIR) of the received signal (for example, CPICH) from a radio base station and applies the result of the measurement to the CQI generating unit 11.

As the measurement of the receiving environment, the slots for transmitting the CQI information are measured periodically from four slots to one slot before the CQI transmission slot. The measurement period may be varied as required. For example, the measurement may be made once within 20 ms and the same measurement result may be repeatedly transmitted within the first through fourth sub-frames. The transmission is then stopped for the remaining six sub-frames. The next measurement is made once in the next radio frame and transmission is executed within the predetermined sub-frames as described above.

Figure 1:
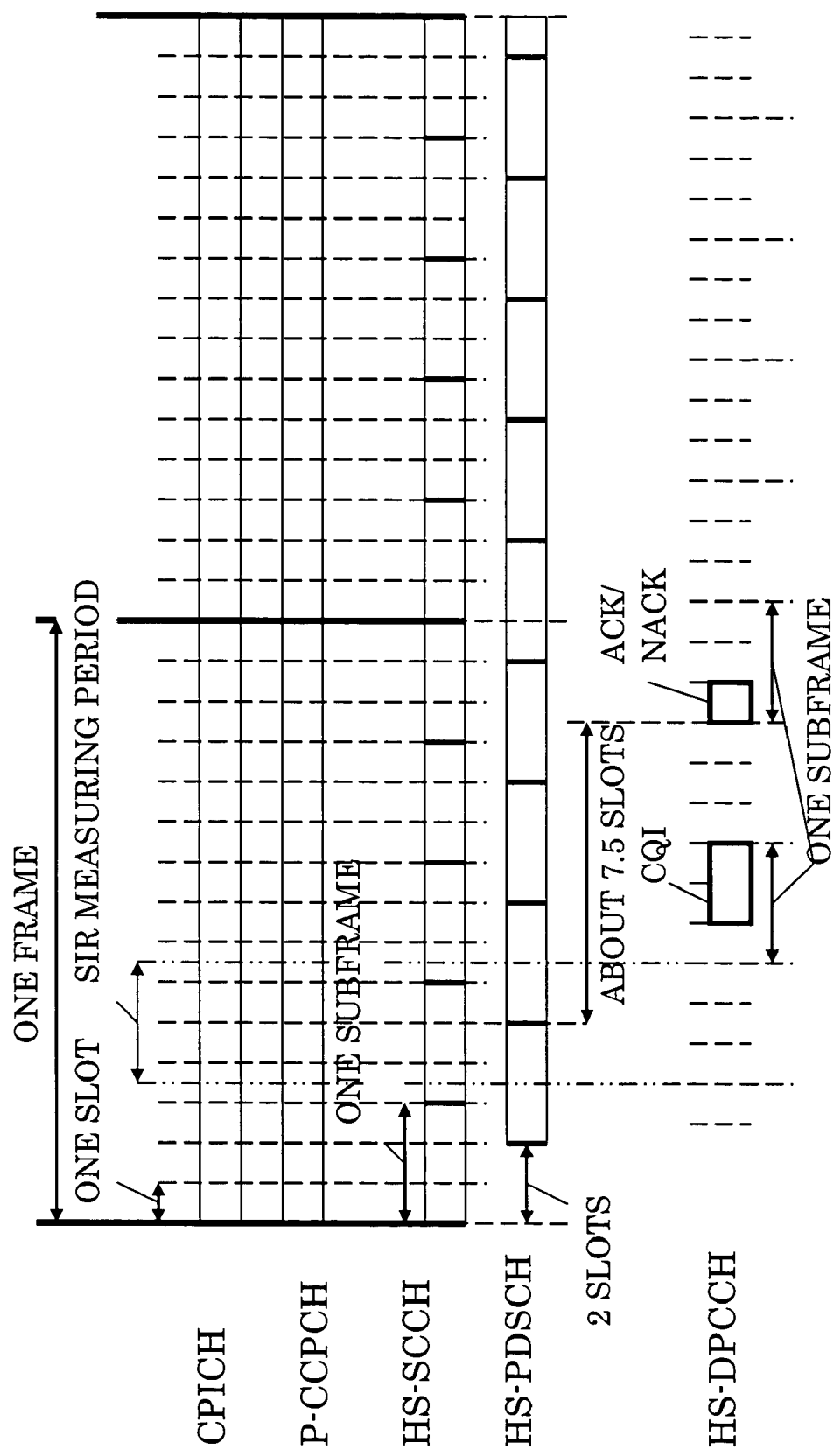
FIG. 1 shows a channel format in the HSDPA.

The HS-SCCH reception processing unit 4 is the reception processing unit for receiving the signal transmitted via the HS-SCCH illustrated in FIG. 1. This unit receives the first slot of the HS-SCCH, demodulates and decodes to judge whether the message to the owner station exists or not.

The first slot is used to transmit the signal obtained by convolutional coding of the Xccs (Channelization Code Set information) and Xms (Modulation Scheme information) and by multiplication of Xue (User Equipment identity). The mobile station is capable of judging whether the message to the owner station exists or not by implementing the inverse arithmetic process and decoding process by utilizing the Xue of the own station. When the message is judged to belong to the appropriate station, the remaining slots of the HS-SCCH are received and the reception of the HS-PDSCH to be transmitted with delay of two slots is attempted.

Here, at the time of receiving the HS-PDSCH, the despreading code designated by the Xccs is set and the demodulation is carried out via the demodulation scheme corresponding to the modulation scheme designated with the Xms. After the two slots of the HS-SCCH, the Xtbs (Transport Block Size information), Xhap (Hybrid ARQ Process information), Xrv (Redundancy and constellation Version), Xnd (New Data indicator) are included. The meanings and roles of these information pieces are well known and the description of them is omitted here.

The HS-PDSCH reception processing unit 5 executes the reception process when the message to the owner station is detected in the HS-SCCH reception processing unit 4 and outputs the result of demodulation and decoding to the MAC-d processing unit 6.

Moreover, the error detection result for the result of decoding (for example, existence or non-existence of the CRC error) is applied to the re-transmission control unit 12.

[Detailed Structure of HS-PDSCH Reception Processing Unit]

Here, the structure of the HS-PDSCH reception processing unit 5 will be described in detail with reference to FIG. 4.

Figure 4:
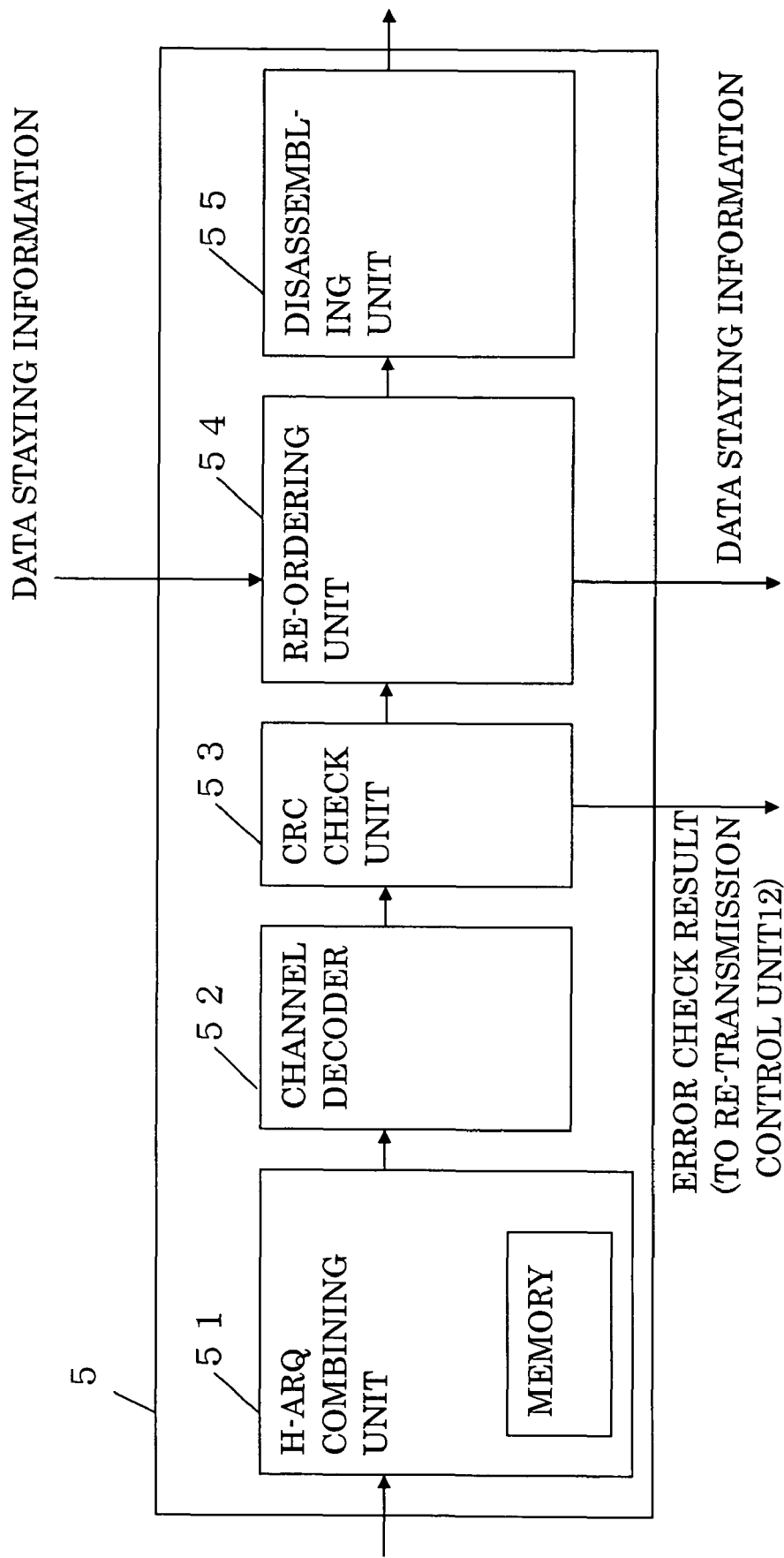
FIG. 4 shows a detailed structure of a HS-PDSC reception processing unit in the present invention.

FIG. 4 illustrates a detailed structure of the HS-PDSCH reception processing unit (MAC-hs processing unit) 5. However, the de-rate matching process and the de-interleave process, corresponding to the inverse processes of the rate matching and the interleave processes respectively, are executed in the transmitting side and are not shown. Inserting the data of the likeliness 0 to the bit portion erased by the rate matching and resetting the sequence of data re-arranged by the rate matching process is executed in the appropriate unit (not shown).

Numeral 51 denotes an H-ARQ combining unit; 52, a channel decoder; 53, CRC checking unit; 54, a re-ordering unit; and 55, a disassembly processing unit.

The data that has been received via the HS-PDSCH and demodulated by the demodulator 3 is then applied to the H-ARQ combining unit 51. The H-ARQ combining unit 51 is provided for executing the H-ARQ combining process, and the received data, when the mobile station has judged the new transmission, is transferred in directly to the channel decoder 52 without the combining process with the received data or the like stored in the memory.

Once the mobile station has analyzed the re-transmission, the new received data is transferred to the channel decoder 52 after combining with the received data stored in the memory. Here, as an example of the combining process, the likeliness information included in the demodulated data is averaged and a mutual supplement of shortage bits may be seen.

Discrimination of the new transmission and re-transmission may be analyzed using the Xnd (New Data indicator) or the like transmitted via the HS-SCCH. For example, when the Xnd has changed to 0 from 1, switching to the new transmission can be detected from a result of 0. When the Xnd maintains at 1, re-transmission can be detected through no variation of the Xnd.

The received data in the new transmission or combined data after combining process in the re-transmission is applied to the channel decoder 52. In the channel decoder 52, the error correcting decoding process, such as the turbo decoding process, is executed for these input data.

Accordingly, even when an error is included in the received data and combined data, the data corrected by error correction is outputted from the channel decoder 52.

The decoded data is subjected to the error detection process by the CRC checking unit 53 and thereby the error existence/non-existence information is applied to the re-transmission control unit 12.

If the data detected does not include any error discovered by the CRC checking unit 53, it is then applied to the reordering unit 54.

The reordering unit 54 executes the reordering process based on the sequence information (for example, TSN) included in the data (MAC-hs PDU) that has been determined to not include errors, and that applies the data to the disassembly processing unit 55 after the reordering process.

The disassembly processing unit 55 executes the erase process of the header and applies the MAC PDU (RLC PDU) to the MAC-d processing unit 6.

Upon detection of generation in missing of sequence during the reordering process, the re-ordering unit 54 drives a T1 timer and transfers, if the missing of sequence is not yet solved until passage of the predetermined period, the data train including the missing of sequence to the MAC-d processing unit 6 via the disassembly processing unit 55 in view of entrusting the process to the re-transmission control in the RLC layer as the upper layer.

Returning to the description with reference to FIG. 3, the MAC-d processing unit 6 executes the secret canceling process to the data sent from the HS-PDSCH reception processing unit 5 and applies the data of the user data to the RLC-D processing unit 7 and the data of the control signal after cancellation of the secret process to the RLC-C processing unit 9.

The RLC-D processing unit 9 executes the re-ordering using the sequence number included in the MAC PDU (RLC PDU) in order to detect errors in sequencing and to check the polling bits.

When sequencing errors are detected, the RLC-D processing unit 7 controls the transmission processing unit 13 to transmit the NACK signal for re-transmission control in the RLC layer to the radio base station via the individual physical channel (DPCH) which is already established separately.

Moreover, upon detection of the setting to request that the polling bits report the PDU condition (for example, generation of missing of sequence or the like), the RLC-C processing unit 9 checks the sequence error condition of the sequence number via the dedicated physical channel (DPCH) which is already established separately. When the sequence error signal is not generated, the unit 9 controls the transmission processing unit 13 to generate the ACK signal via the DPCH. When the sequence missing is generated, the unit 9 controls the transmission processing unit 13 to generate the NACK signal.

The RLC-C processing unit 9 applies the control data required among the control data received from the radio base station to the RRC processing unit 10 to execute the radio resource control.

The data having been subjected to the re-ordering process in the RLC-D processing unit 7 is then transferred to the TE (terminal equipment) 8 for implementation of the transmission (transfer) process to the external apparatus (not illustrated).

Namely, when an external apparatus such as a PC or an image display unit or the like is connected by wire or radio to a mobile station, the mobile station transmits (transfers) the data received via the HS-PDSCH from the radio base station to the external apparatus.

However, when the transmission rate for the external apparatus is lower, the data to be transmitted to the external apparatus is sometimes left in the buffer of the TE or the like and thereby the data may be cancelled because of overflow of the buffer.

In this case, for example, supply of the transmitting data to the side of TE 8 may be controlled with the buffer in the re-ordering unit 54 by flow control for the HS-PDSCH reception processing unit 5 or the like. However, the buffer in the re-ordering unit 54 generates overflow in some cases and thereby the data may also be cancelled as described above.

Accordingly, in this embodiment, the staying condition of the data to be transmitted (transferred) to the external apparatus is supervised by a unit for processing the data to be transmitted (transferred) to the external apparatus such as the TE 8, HS-PDSCH reception processing unit 5 (for example, re-ordering unit 54) or the like and the data staying information as the result of supervising process is applied to the CQI generating unit 11 and re-transmission control unit 12.

[When the Data Staying Information is Applied to the CQI Generating Unit 11]

As described previously, the reception quality information of the received signal from the radio base station (for example, the received SIR of CPICH) is also input to the CQI generating unit 11 from the demodulator 3. Therefore, the CQI value in accordance with the reception quality is usually generated based on the CQI table shown in FIG. 2 and applied to the transmission processing unit 13 as the CQI information. The CQI table is included in the CQI generating unit 11.

However, in this embodiment, the staying condition (for example, amount of data being stored) information of the data to be transmitted to the external apparatus is also applied to the CQI generating unit 11 with the TE 8 or the like.

The CQI generating unit 11 generates the CQI information reflecting the data staying condition and then transmits the generated CQI information to the transmission processing unit 13.

As an example of reflection, the CQI value corresponding to the reception quality is compensated in accordance with the staying condition.

Namely, when the staying condition indicates that the amount of stored data to be transmitted to the external apparatus has exceeded the predetermined threshold value, the CQI value is compensated in the direction to lower the transmission rate with the adaptive modulation control.

For example, when the reception quality indicates that the SIR is equal to 15.5 (dB), the CQI value 16 is compensated to have a value of at most 15 (compensated to provide the lower transmission rate). In this case, the modulation scheme in the radio base station is switched to QPSK from 16 QAM.

Accordingly, the radio base station lowers the transmission rate through adaptive modulation control. This results in an increase in the amount of stored data that stays within the mobile station, due to the disabling of transmission to the external apparatus.

Therefore, the amount of data overwritten in the mobile station can be minimized, and throughput can also be improved due to decreased necessity for re-transmission control in the upper layer.

In this embodiment, the CQI information has been generated with reference to the reception quality from the radio base station, but when it is required to indicate that the amount of stored data to be transmitted to the external apparatus has become higher than the predetermined threshold value, it is also possible to select the CQI value, without relation to the reception quality, to select the transmission method to provide comparatively lower transmission rate with the adaptive modulation control by setting the CQI values to between 1 and 10.

In any case (when the reception quality is reflected or not reflected), the data staying condition is also reflected for generation of the CQI value.

Moreover, in this case, the CQI value is selected on the basis of the data staying information from the TE 8, but if the part for management of the data to be transmitted to the external apparatus exists additionally, the data staying condition of such part is supervised and the result of the supervising process can also be applied to the CQI generating unit 11.

For example, the re-ordering unit 54 can delay the transmission (transfer) of data by transferring the data to the MAC-d processing unit 6, or it can extend the waiting time for missing of sequence by setting a longer time of the T1 timer for implementation of the flow control as described above. However, it is also possible that the amount of data staying in the own buffer is applied to the CQI generating unit 11 as the data staying information to execute a similar process during the process of flow control.

[When the Data Staying Information is Applied to the Retransmission Control Unit 12]

As described above, the error detection result (information indicating the presence or non-presence of the CRC error) of the received data from the radio base station received via the HS-PDSCH from the HS-PDSCH reception processing unit 5 (CRC checking unit 53) is also input to the re-transmission control unit 12. Therefore, when a CRC error exists, the NACK signal is usually applied to the transmission processing unit 13. When a CRC error does not exist, the ACK signal is applied thereto in order to transmit the response signal to the radio base station.

In this embodiment, however, the information of the staying condition (for example, amount of data stored) of the data to be transmitted to the external apparatus is also applied to the re-transmission control unit 12 with the TE 8 or the like.

The re-transmission control unit 12 generates not only the CRC check result but also the re-transmission request signal (NACK signal) reflecting the staying condition of the data and then transmits these signals to the transmission processing unit 13.

As an example of reflection, even if the CRC check result shows non-existence of error, the NACK signal is transmitted, or neither the ACK signal nor NACK signal is transmitted in accordance with the staying condition.

Namely, when the staying condition indicates that amount of data stored to be transmitted to the external apparatus becomes equal to or higher than the predetermined threshold value, the NACK signal is transmitted or neither the ACK signal nor the NACK signal is transmitted.

Accordingly, since the radio base station detects the DTX condition in which neither the ACK signal nor the NACK signal is received from the mobile station or detects the NACK signal received from the mobile station, this base station also executes the re-transmission control concerning the data transmitted previously.

Accordingly, since the mobile station is not required to apply (or does not apply) the received data to be combined with the re-transmission data to the upper layer unit for the CRC check unit 53 such as the reordering unit 64 (55, 6, 7, 8) or the like until the re-transmission is carried out, staying of the data in the upper layer unit may be controlled.

The staying condition in the host side unit can be minimized by repetition of the control to transmit the NACK signal or to transmit neither the ACK signal nor the NACK signal, since it is not required to apply the data to be combined with this re-transmission signal to the upper layer unit while a series of re-transmission controls are executed.

However, when the number of times of transmission exceeds the maximum number of times of re-transmission, the new data is input to the H-ARQ combining unit 51. Therefore, when no error is detected by the CRC check in the final re-transmission, it is desirable that the ACK signal and NACK signal according to the staying condition are not transmitted (these transmissions based on the CRC check results are allowed) and the data is transferred to the upper side unit.

Moreover, it is also desirable that the control corresponding to the staying condition of data is limited only to that when the response is transmitted to the new transmission or to that when the response is transmitted to the N-th re-transmission (the final re-transmission is defined as the (N+1)-th re-transmission) from the response to the new transmission.

If the H-ARQ combining unit 51 transmits the NACK signal or transmits neither the NACK signal nor the ACK signal under the control in accordance with the staying condition of data even when no error is detected by the CRC check in the CRC check unit 53, it is desirable that the data stored in the memory of the H-ARQ combining unit 51 is decoded by the channel decoder 52 without combining with the re-transmitted data.

The reason for this step is that error-free data is possibly incorrectly detected as data including an error, from the view point of error correction, if the unwanted data is received and is then decoded after the combining process.

It is of course possible to decode the data after the combining process because the re-transmission is conducted.

Since the re-transmission control is carried out by the lower layer showing smaller delays in the re-transmission control, load is never shared unnecessarily to many units and it is no longer required to rely on the re-transmission control of the upper layer with its larger delay time. Accordingly, an increase in the amount of data stored in the mobile station due to an inability to transmit the data to an external apparatus can be adjusted and controlled adequately.

In this embodiment, reference is made to the check result of the CRC check unit 53, but it is also possible, when transmission of the ACK signal and NACK signal is required to the radio base station because the HS-PDSCH has been received, that the NACK signal is transmitted or neither the ACK signal nor the NACK signal is transmitted, with reference to the check result, when the staying condition of the data has exceeded the predetermined threshold value.

Moreover, in this embodiment, the data staying information from the TE 8 is used for decision, but when the external apparatus includes a component for management of data to be transmitted, it is also possible that such part be used to supervise the staying condition of data and the result of supervising is applied to the re-transmission control unit 12.

[b] Explanation of a Second Embodiment

In the first embodiment, control is executed in accordance with the staying condition of data in the mobile station, but in this second embodiment, the control is executed in accordance with the specifications of an external apparatus connected by wire or radio to the mobile station or by another mode of connection.

First, a mobile station is connected by wire or radio with an external apparatus via a TE 8 and receives the specification information of the external apparatus from the same external apparatus via the TE 8. The specification information received is converted into data staying information and is then applied to the CQI generating unit 11.

Thereby, the CQI generating unit limits the candidates of the CQI value to be transmitted to the radio base station in accordance with this specification information. The CQI generating unit 11 is assumed to store the CQI table of FIG. 2 to the memory provided in the own station.

For example, the CQI values of 1 to 15 are limited as the candidates for selection in accordance with the attribute information and if the reception quality corresponds to any of the CQI values greater than or equal to 16, the CQI value to be transmitted to the radio base station is limited to 15.

As an example of the attribute information to give such limitations, there is the information indicating that the external apparatus can uses a low transmission rate and that the external apparatus is suitable for low speed data processing. Moreover, the CQI value for enabling such selection is limited when the external apparatus cannot perform the processing (or is not suitable for the processing) in accordance with the data received in the maximum transmission rate provided by the HSDPA.

Therefore, the reception result for the data transmitted under the adaptive modulation control executed in the limitation of such CQI value is sequentially transmitted (transferred) to the external apparatus from the TE 8.

The attribute information can also be input from a manipulation part of the mobile station.

Moreover, it is also possible to give, to the CQI generating unit 11, the mobile-to-external apparatus connection mode information instead of the data staying information.

The CQI generating unit limits the candidates of the CQI value to be transmitted to the radio base station in accordance with such connection mode information.

For example, the external apparatus connection mode information is applied to the CQI generating unit from the manipulation component of the external apparatus, or TE 8 (or connection mode management unit in the mobile station) or mobile station. When the connection mode is suitable for a low transmission rate (connection mode enabling a low transmission rate), the CQI generating unit limits the CQI values 1 to 15 as the candidates for selection and also limits the CQI value to be transmitted to the radio base station to 15 even when the reception quality is suitable for the CQI value of 16 or higher.

When the connection mode is suitable for a high transmission rate (connection mode enabling higher transmission rate), the CQI values 1 to 30 (all values) are set as the candidates for selection and the data is transmitted by selecting the CQI value which is suitable for the reception quality.

Accordingly, the reception result of the data transmitted under the adaptive modulation control executed in such limitation of the CQI value is sequentially transmitted (or transferred), to the external apparatus, in accordance with the connection mode from the TE 8 of the mobile station.

As described above, since the adaptive modulation control suitable for the external apparatus or the connection mode of the external apparatus is executed in the radio base station before the generation of the staying condition of data, useless consumption of radio resources can be minimized.

The communication apparatus of the embodiment is capable of providing a radio communication apparatus, for example, a mobile station that analyzes the transmission of data to an external apparatus.

Moreover, the adaptive modulation control and re-transmission control can be realized by analyzing the transmission of data to an external apparatus and effective use of radio resources; reduction in deterioration of the transmission rate of data to an external apparatus can also be realized.

In addition, it is possible to minimize unnecessary use of radio resources by analyzing the specifications of an external apparatus or connection mode of the external apparatus.

What is claimed is:

1. A radio communication apparatus that communicates with a transmitter executing an adaptive modulation control, the radio communication apparatus comprising:
   a supervising unit to supervise a staying condition of data to be transmitted to an external apparatus which is connected by wire or radio to the radio communication apparatus that received the data transmitted from the transmitter;
   a parameter generating unit to generate a value indicating a channel quality reflecting a supervising result by the supervising unit, the value corresponding to parameters used for the adaptive modulation control in the transmitter; and
   a transmitting unit to transmit the value to the transmitter;
   wherein the parameter generating unit further generates a value corresponding to parameters for transmission of the data to the external apparatus at a lower transmission rate, in a case where the staying condition of the data that the amount of the data to be transmitted to the external apparatus becomes higher.

2. The radio communication apparatus according to claim 1, wherein the external apparatus is a PC (personal computer) or an image display unit.

3. A radio communication apparatus that communicates with a transmitter executing a re-transmission control in accordance with a re-transmission request, the radio communication apparatus comprising:
   a supervising unit to supervise a staying condition of data to be transmitted to an external apparatus which is connected by wire or radio to the radio communication apparatus that received data transmitted from the transmitter; and
   a re-transmission control unit to transmit the re-transmission request to the transmitter based on both of a supervising result by the supervising unit and an error detecting result of received data from the transmitter so that the re-transmission control is executed in the transmitter;
   wherein the re-transmission request based on both of the supervising result and the error detecting result is limited to a response to a new transmission or to an N-th re-transmission from the new transmission, wherein N is a natural number which is smaller than a maximum number of times of re-transmission.

4. The radio communication apparatus according to claim 3, wherein the external apparatus is a PC (a personal computer) or an image display unit.

5. A mobile station that is configured to HSDPA (High Speed Downlink Packet Access) transmission and communicates with a radio base station executing a re-transmission control in accordance with a reception of a NACK (Negative ACKnowledgement) signal or a reception of neither an ACK (ACKnowledgement) signal nor a NACK signal, the mobile station comprising:
- a supervising unit to supervise a staying condition of data to be transmitted to an external apparatus which is connected by wire or radio to the radio communication apparatus that received data transmitted from the transmitter; and
- a transmitting unit to transmit the NACK signal to the radio base station or to transmit neither the ACK signal nor the NACK signal to the radio base station based on both of a supervising result by the supervising unit and an error detecting result of received data from the radio base station, so that the re-transmission control is executed in the radio base station;
- wherein the transmitting unit transmits the NACK signal when an error exists in the received data from the radio base station and transmits the ACK signal when an error does not exist in the received data from the radio base station; and
- wherein the transmitting unit further transmits the NACK signal or transmits neither the ACK signal nor the NACK signal, when the staying condition indicates that an amount of the data to be transmitted to the external apparatus becomes lower than a given threshold and the error is detected in the received data, or when the staying condition indicates the amount of the data to be transmitted to the external apparatus becomes equal to or higher than the given threshold.

6. The mobile station according to claim 5, wherein the external apparatus is a PC (Personal Computer) or an image display unit.

* * * * *